(12) United States Patent
Ono et al.

(10) Patent No.: US 12,734,590 B2
(45) Date of Patent: Sep. 15, 2026

(54) COLLET BUSH AND TOOL DRIVING DEVICE

(71) Applicant: SUBARU CORPORATION, Tokyo (JP)

(72) Inventors: Ryohei Ono, Tokyo (JP); Masao Watanabe, Tokyo (JP); Hiroyuki Sugawara, Tokyo (JP); Rei Nakamoto, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 437 days.

(21) Appl. No.: 18/449,542

(22) Filed: Aug. 14, 2023

(65) Prior Publication Data

US 2024/0075538 A1 Mar. 7, 2024

(30) Foreign Application Priority Data

Sep. 6, 2022 (JP) ................................ 2022-141790

(51) Int. Cl.
*B23B 49/02* (2006.01)
*B23B 31/40* (2006.01)
(Continued)

(52) U.S. Cl.
CPC .................................. *B23B 49/02* (2013.01)

(58) Field of Classification Search
CPC ..... B23B 49/02; B23B 31/4006; B23B 47/34; B23B 45/003; B23B 2222/04;
(Continued)

(56) References Cited

U.S. PATENT DOCUMENTS 5,332,343 A 7/1994 Watanabe et al.
5,628,592 A * 5/1997 Ringer .................. B23B 49/02 408/97
(Continued)

FOREIGN PATENT DOCUMENTS

CN 209452833 U * 10/2019
EP 1 430 993 A2 6/2004
(Continued)

OTHER PUBLICATIONS

JP S63-64415, English Machine Translation; Apr. 28, 1988; pp. 1-3 (Year: 1988).*
(Continued)

*Primary Examiner* — Bayan Salone
(74) *Attorney, Agent, or Firm* — Smith, Gambrell & Russell, LLP

(57) ABSTRACT

A collet bush includes a tapered cylindrical outer surface, a cylindrical inner surface and a flow path. The collet bush is to be inserted into a concentric collet that is attached to a handheld tool driving device in order to position the tool driving device to a workpiece. The tool driving device holds, rotates and feeds a tool. The tool driving device has a function to suck chips. The outer surface is for expanding the concentric collet. The inner surface forms a through hole for slidably fitting the tool. The flow path is for taking in air used for sucking the chips inside the collet bush. The tool driving device includes the above-mentioned collet bush and the concentric collet.

20 Claims, 6 Drawing Sheets

(51) Int. Cl.

| | |
|---|---|
| ***B23B 45/00*** | (2006.01) |
| ***B23B 47/34*** | (2006.01) |
| ***B23Q 11/00*** | (2006.01) |

(58) Field of Classification Search

CPC .......... B23B 2226/275; B23B 2226/33; B23B 2250/12; B23B 2270/62; B23Q 11/0046

See application file for complete search history.

(56) References Cited

U.S. PATENT DOCUMENTS

| | | | | |
|---|---|---|---|---|
| 6,789,663 | B2 * | 9/2004 | Galletti .................. | B65G 53/48 406/102 |
| 7,934,892 | B2 * | 5/2011 | Fritsche ................ | B23B 49/023 408/72 R |
| 10,399,150 | B2 * | 9/2019 | Bookheimer ......... | B23B 31/202 |
| 10,994,344 | B2 * | 5/2021 | Atzori ................ | B23Q 11/1092 |
| 2008/0145160 | A1 | 6/2008 | Fritsche et al. | |
| 2018/0347701 | A1 * | 12/2018 | Bookheimer ......... | B23B 31/202 |

FOREIGN PATENT DOCUMENTS

| | | | | |
|---|---|---|---|---|
| JP | S6282407 | U | * | 5/1987 |
| JP | S63-064415 | U | | 4/1988 |
| JP | S6364415 | U | * | 4/1988 |
| JP | 2005342829 | A | * | 12/2005 |
| JP | 2018034223 | A | * | 3/2018 |

OTHER PUBLICATIONS

Extended European Search Report mailed Feb. 14, 2024 in European Patent Application No. 23190333.7 (9 Pages).

Desoutter Aerospace Catalog. Issue 1. English. Mar. 2019. https://us.desouttertools.com/uploads/documents/5dd3f490cb9aa_Desoutter%20Aerospace%20Catalog_ENG.pdf (200 pages—in 2 parts due to file size).

Office Action mailed Jun. 2, 2026 for Japanese Patent Application No. 2022-141790 (6 pages in Japanese; 6 pages English machine translation).

* cited by examiner

COLLET BUSH AND TOOL DRIVING DEVICE

CROSS REFERENCES TO RELATED APPLICATIONS

This application is based upon and claims the benefit of priority from Japanese Patent Application No. 2022-141790, filed on Sep. 6, 2022; the entire contents of which are incorporated herein by reference.

FIELD

Implementations described herein relate generally to a collet bush and a tool driving device.

BACKGROUND

When a workpiece to be drilled is drilled using a handheld tool driving device, it is necessary to position the tool driving device to the workpiece. As one of the tools for this purpose, a concentric collet is known (for example, refer to U.S. Pat. No. 5,628,592).

The concentric collet has cylindrical structure having two or more slits. The through hole inside the concentric collet is tapered. When a tapered bush is inserted into the through hole of the concentric collet, the diameter of the concentric collet is widened. Accordingly, when a tapered bush attached as a nosepiece to a tool driving device is inserted into the inside of the concentric collet in a state where the concentric collet has been inserted into a positioning hole formed in a drilling jig, such as a drilling plate, fixed to a workpiece, the diameter of the concentric collet is widened, and thereby the tool driving device can be positioned and fixed to the drilling jig.

In case of using a handheld tool driving device for drilling a workpiece, it is desired to collect chips. Accordingly, there is also known a tool driving device that has a function to suck chips and allows the use of a concentric collet (for example, refer to U.S. Pat. No. 10,994,344 B2 and DESOUTTER Industrial Tools, Catalog, [online], [searched on Jul. 20, 2022], Internet <URL: https://us.desouttertools.com/uploads/documents/5dd3f490cb9aa_Desoutter % 20Aerospace %20 Catalog_ENG.pdf>).

However, in case of sucking chips while using a concentric collet, a gap between a collet bush and a drill serves as an air flow path for the suction. Accordingly, there is a problem that the air flow path is narrowed and thereby the suction power may become insufficient when the collet bush slidably fit with the shank of the drill so that wobbling may not arise in the drill is inserted into the concentric collet.

Conversely, when the gap between the collet bush and the shank of the drill is made large in order to secure the suction power of chips, there is a problem that the shank of the drill dose not slidably fit with the collet bush, and therefore it becomes impossible to prevent the drill from wobbling.

Accordingly, an object of the present invention is to make it possible to prevent a tool from wobbling while securing suction power of chips in case of using a concentric collet for positioning a handheld tool driving device, having a function to suck chips, to a workpiece.

SUMMARY

In general, according to one implementation, a collet bush includes a tapered cylindrical outer surface, a cylindrical inner surface and a flow path. The collet bush is to be inserted into a concentric collet that is attached to a handheld tool driving device in order to position the tool driving device to a workpiece. The tool driving device holds, rotates and feeds a tool. The tool driving device has a function to suck chips. The outer surface is for expanding the concentric collet. The inner surface forms a through hole for slidably fitting the tool. The flow path is for taking in air used for sucking the chips inside the collet bush.

Further, according to one implementation, the tool driving device includes the above-mentioned collet bush and the concentric collet.

DETAILED DESCRIPTION

A collet bush and a tool driving device according to implementations of the present invention will be described with reference to accompanying drawings.

First Implementation

Structure and Functions

Figure 1:
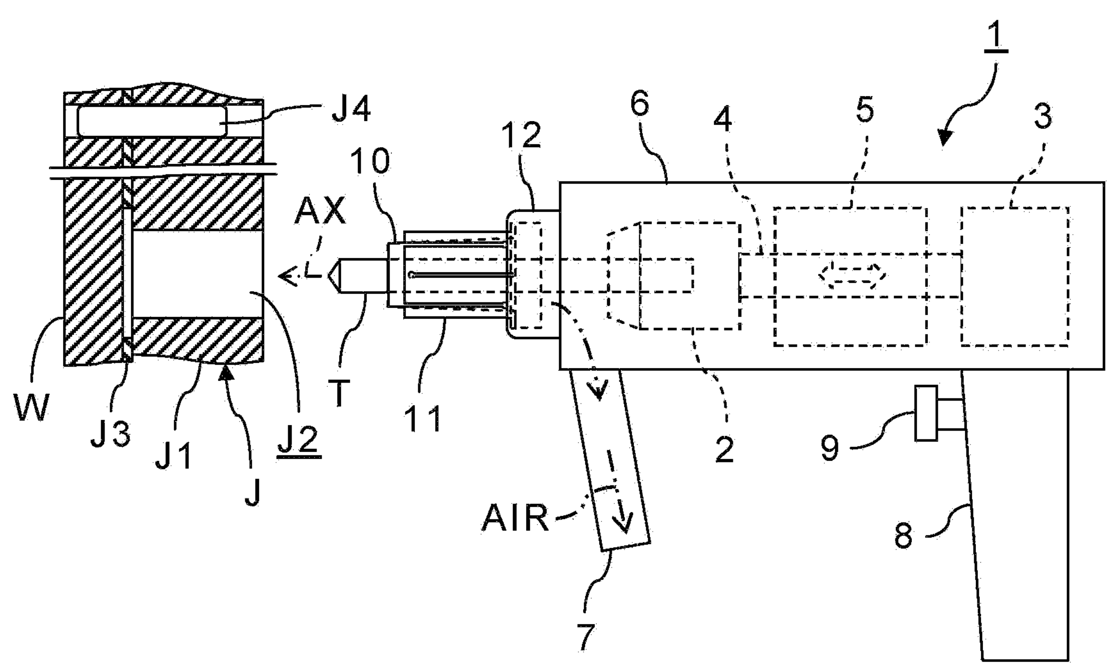
FIG. 1 is a front view showing structure of a tool driving device including a collet bush according to the first implementation of the present invention.

FIG. 1 is a front view showing structure of a tool driving device including a collet bush according to the first implementation of the present invention.

A tool driving device 1 is a handheld device for holding, rotating and feeding a tool T, such as a drill or a reamer, for hole processing. In addition, the tool driving device 1 has a function to suck chips. Accordingly, the tool driving device 1 has a holder 2, a motor 3, a spindle 4, a feeding mechanism 5, a housing 6 and a suction port 7. The holder 2 is for holding the tool T. The motor 3 rotates the holder 2. The spindle 4 transmits torque from the motor 3 to the holder 2 and the tool T. The feeding mechanism 5 feeds out the tool T. The housing 6 houses the motor 3. A dust collector can be coupled to the suction port 7 with a hose or the like, and thereby air for sucking chips can be made to flow by suction.

The suction port 7 may be formed as a part of the housing 6, or may be coupled to the housing 6. The housing 6 is provided with a grip 8 for a user to hold and a switch 9 for a user to manually control the motor 3.

The motor 3 may be pneumatic, electric or hydraulic. Gears may be coupled between the motor 3 and the spindle 4 to change the rotation speed. In case of coupling gears to the motor 3, the output shaft of the motor 3 can also be made parallel or non-parallel to the rotation axis of the spindle 4.

The feeding mechanism 5 is a device that reciprocates the holder 2 and the spindle 4 in the tool axis AX direction. The feeding mechanism 5 can be composed of at least one desired machine element, such as a cylinder, a ball screw, or gears like a rack and pinion, for linearly moving the holder 2 and the spindle 4. A pneumatic, electric, or hydraulic motor can also be used as a power source for the feeding mechanism 5. Alternatively, the motor 3 for rotating the holder 2 may be used as the power source for the feeding mechanism 5. That is, the rotating operation and feeding operation of the tool T may be performed by separate motors, or may be performed by a common motor.

A collet bush 10 and a concentric collet 11 for positioning the housing 6 of the tool driving device 1 on a workpiece W to be drilled can be detachably attached to the tip of the housing 6. A part attached to the tip of the housing 6 is also called a nosepiece. A positioning bush attached to as a part of the nosepiece is also called a bushing tip. The concentric collet 11 is a general-purpose collet having a centering function.

Figure 2:
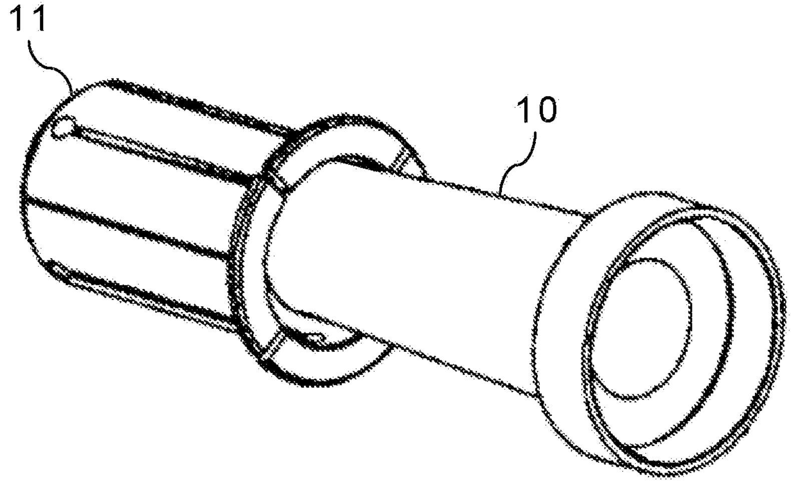
FIG. 2 is an exploded perspective view showing an example of structure of the collet bush and the concentric collet shown in FIG. 1.
Figure 3:
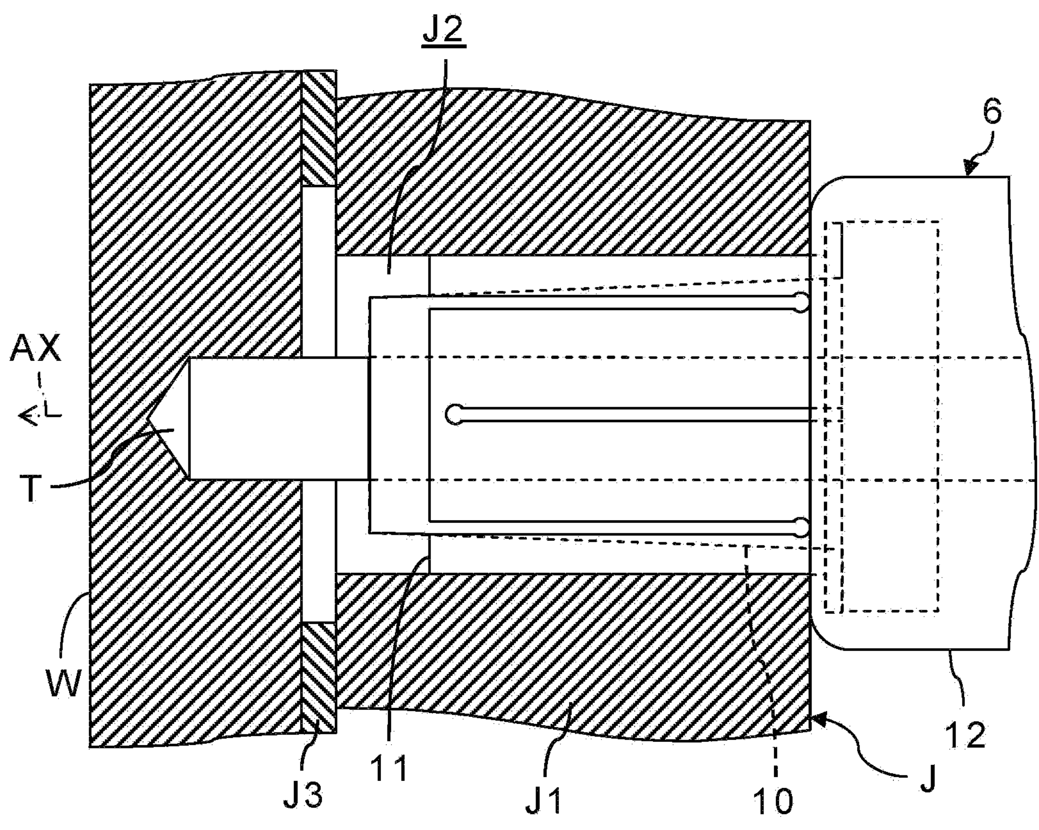
FIG. 3 shows an example in which the housing of the tool driving device is positioned to the workpiece by the concentric collet shown in FIG. 1.

FIG. 2 is an exploded perspective view showing an example of structure of the collet bush 10 and the concentric collet 11 shown in FIG. 1. FIG. 3 shows an example in which the housing 6 of the tool driving device 1 is positioned to the workpiece W by the concentric collet 11 shown in FIG. 1.

As illustrated, the concentric collet 11 has a cylindrical shape having slits whose length direction is the central axis direction of the concentric collet 11. Each slit of the concentric collet 11 does not reach either the end face on the distal end side or the end face on the proximal end side. The inner through hole of the concentric collet 11 is tapered so that the inner diameter gradually decreases toward the distal end of the concentric collet 11. On the other hand, the collet bush 10 is tapered so that the outer diameter gradually decreases toward the distal end of the collet bush 10.

Accordingly, when the tapered collet bush 10 attached as the nosepiece of the tool driving device 1 is inserted into the inside of the concentric collet 11 in a state where the concentric collet 11 has been inserted into a positioning hole J2 formed in a drilling jig J, such as a drilling plate J1, fixed to the workpiece W, the diameter of the concentric collet 11 is expanded, and thereby the tool driving device 1 can be positioned and fixed to the drilling jig J. That is, when the concentric collet 11 covering the collet bush 10 is pulled toward the proximal end side, the diameter of the concentric collet 11 increases, and thereby the concentric collet 11 can be locked to the drilling jig J, such as the drilling plate J1.

In the illustrated example, the drilling plate J1 is set on the workpiece W with a shim J3 interposed therebetween. The positioning hole J2 of the drilling plate J1 is positioned at a hole processing position by inserting a positioning pin J4 into both of reference hole of the workpiece W and a reference hole of the drilling plate J1. Not that, hole processing may be not only drilling by a drill, but also finishing of a hole by a reamer.

The collet bush 10 and the concentric collet 11 have flanges on the proximal end sides respectively. Accordingly, the collet bush 10 and the concentric collet 11 can be coupled to the housing 6 by disposing the flanges of the collet bush 10 and the concentric collet 11 inside the housing 6, and meanwhile protruding the distal portions of the collet bush 10 and the concentric collet 11 from a through hole formed at the distal portion of the housing 6.

The distal portion of the housing 6, the flanges formed on the proximal end sides of the collet bush 10 and the concentric collet 11, and the like can be provided with coupling structure, such as threads, so that the collet bush 10 and the concentric collet 11 can be fixed to the housing 6. In the illustrated example, a detachable cap 12 is attached to the distal portion of the housing 6. The flanges of the collet bush 10 and the concentric collet 11 are disposed inside the cap 12. The distal portions of the collet bush 10 and the concentric collet 11 are protruded from a through hole of the cap 12. By removing the cap 12, not only the collet bush 10 and the concentric collet 11 can be attached to and detached from the housing 6, but also the tool T can be attached to and detached from the holder 2.

The inside of the collet bush 10 is used to pass the tool T, and is also used to form air flow paths at the time of chip suction. Specifically, when the dust collector coupled to the suction port 7 with a hose or the like is operated, a flow of suction air is formed from the inside of the collet bush 10 toward the suction port 7 through the inside of the housing 6. The air flow paths for chip suction are formed inside the collet bush 10 separately from the through hole for sliding the tool T.

Next, an example of detailed structure of the collet bush 10 will be described.

Figure 4:
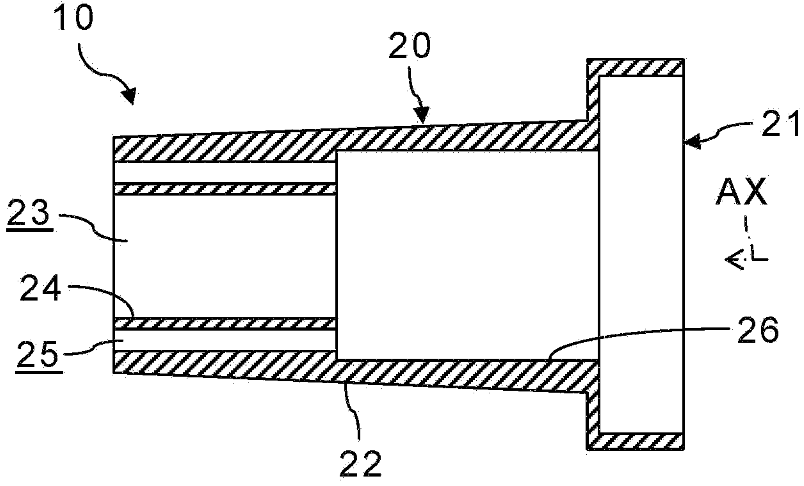
FIG. 4 is a longitudinal sectional view showing detailed structure of the collet bush shown in FIG. 1.
Figure 5:
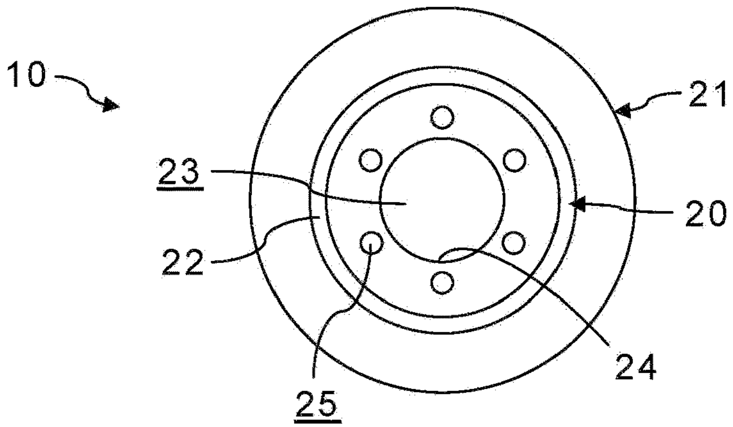
FIG. 5 is a left side view of the collet bush shown in FIG. 4.
Figure 6:
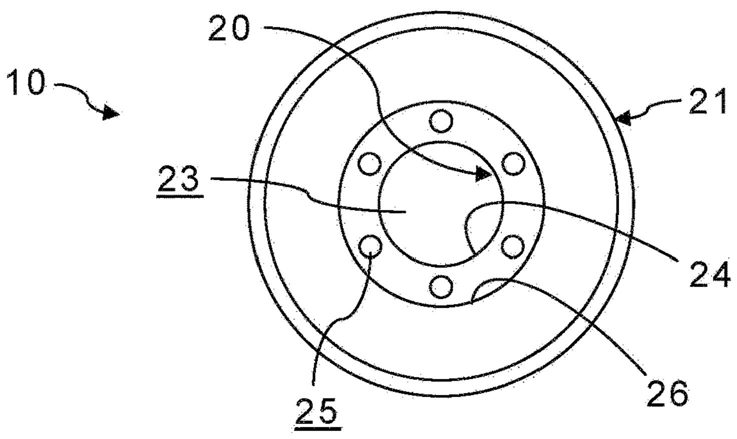
FIG. 6 is a right side view of the collet bush shown in FIG. 4.

FIG. 4 is a longitudinal sectional view showing detailed structure of the collet bush 10 shown in FIG. 1. FIG. 5 is a left side view of the collet bush 10 shown in FIG. 4. FIG. 6 is a right side view of the collet bush 10 shown in FIG. 4.

As shown in FIG. 4 to FIG. 6, the collet bush 10 has a cylindrical insertion part 20 and a cylindrical flange 21. The insertion part 20 is protruded from the housing 6 and inserted into the concentric collet 11. The flange 21 is disposed inside the housing 6 and fixed to the housing 6. The insertion part 20 has a tapered cylindrical outer surface 22 and a cylindrical inner surface 24. The outer surface 22 is used for expanding the concentric collet 11. The inner surface 24 forms a through hole 23 slidably fit with the tool T.

Since the diameter of the outer surface 22 of the insertion part 20 becomes small gradually toward the distal end, the outer surface 22 of the insertion part 20 is a curved surface similar to the side surface of a truncated cone. On the other hand, the inner surface 24 of the insertion portion 20 for being slidably fit with the tool T has a constant diameter so that the inner surface 24 may be slidably fit with the tool T. Accordingly, the inner surface 24 of the insertion part 20 for being slidably fit with the tool T is cylindrical, i.e., a curved surface similar to the side surface of a circular column.

The diameter of the flange 21 is larger than the maximum diameter of the outer surface 22 of the insertion part 20.

Accordingly, only the flange 21 can be retained inside the housing 6. As described above, coupling structure, such as an internal thread or an external thread, can be formed on the inner surface or the outer surface of the flange 21 in accordance with coupling structure on the housing 6 side so that the collet bush 10 can be fixed to the cap 12 of the housing 6 or the like.

In addition, inside the collet bush 10, through holes 25 are formed between the outer surface 22 and the inner surface 24 of the insertion portion 20 as air flow paths for taking air for suction into the inside of the collet bush 10. Although a single air through hole 25 may be formed in principle, it is reasonable to form a plurality of the through holes 25 from a viewpoint of securing the chip suction force.

In the illustrated example, the first inner surface 24 slidably fit with the tool T is formed only on a part of the collet bush 10 on the distal end side in the length direction. As a result, the second inner surface 26 on the rear side of the first inner surface 24 slidably fit with the tool T has a diameter larger than the diameter of the first inner surface 24 slidably fit with the tool T. That is, a stepped through hole is formed inside the insertion part 20 of the collet bush 10. In this case, interference between the collet bush 10 and a shank having a larger diameter than the tool diameter of the tool T can be reduced at the time of feeding out the tool T while slidably fitting the tool T with the first inner surface 24 of the insertion portion 20.

Accordingly, the through holes 25 for air are formed between the outer surface 22 of the insertion portion 20 and the first inner surface 24 of the insertion portion 20 slidably fit with the tool T. That is, one end of each through hole 25 is open at the end face of the collet bush 10 on the distal end side while the other end of each through hole 25 is open at an annular face formed as a level difference between the first inner surface 24 having the smaller diameter and the second inner surface 26 having the larger diameter. As a result, the central axes of the through holes 25 respectively forming the air flow paths are each parallel to the central axis of the through hole 23 slidably fit with the tool T.

Although a step may be formed on the end face of the collet bush 10 on the distal end side so that each through hole 25 may be opened inside the insertion portion 20, opening each through hole 25 on the end face of the collet bush 10 on the distal end side, as illustrated, allows making the diameter of each through hole 25 as large as possible while keeping the plate thickness necessary for ensuring the strength of the collet bush 10. Therefore, the chip suction effect can be improved.

In particular, the length of the insertion portion 20 of the collet bush 10 is longer than the length of the concentric collet 11, like a typical conventional collet bush. Accordingly, when the insertion portion 20 of the collet bush 10 is inserted into the concentric collet 11, the distal end of the insertion portion 20 protrudes from the concentric collet 11. Therefore, when the end face of the collet bush 10 on the distal end side is not brought into contact with the workpiece W, from the viewpoint of avoiding damage to the workpiece W, as exemplified in FIG. 3, a sufficient flow rate of air for chip suction can be taken in from each through hole 25 opened on the end face of the collet bush 10 on the distal end side.

In the collet bush 10 as described above, the dedicated through holes 25 are formed therein as flow paths for air for collecting chips, apart from the through hole 23 for being slidably fit with the tool T. Moreover, the tool driving device 1 is provided with the above-mentioned collet bush 10 and the concentric collet 11.

Effects

Therefore, according to the collet bush 10 and the tool driving device 1, it is possible to both prevent the tool T from wobbling and secure the power to suck chips while the concentric collet 11 is used to position the tool driving device 1 to the workpiece W. That is, the tool T can be prevent from wobbling by slidably fitting the tool T with the first inner surface 24 of the insertion portion 20 of the collet bush 10 while the chip suction effect can be kept by the sufficient air flow using the through holes 25. As a result, chip clogging can be avoided while keeping the accuracy of hole processing. In addition, the tool T can be air-cooled since the flow rate of air for chip suction can be secured.

In particular, in case of hole processing of not only a fiber reinforced plastic (FRP), such as glass fiber reinforced plastic (GFRP) or carbon fiber reinforced plastic (CFRP), but also laminated materials of an FRP and a metal, such as aluminum, it is important to both ensure the hole processing accuracy and avoid chip clogging. Therefore, in such hole processing, the requirements can be easily met by using the above-mentioned collet bush 10 and tool driving device 1.

Second Implementation

Figure 7:
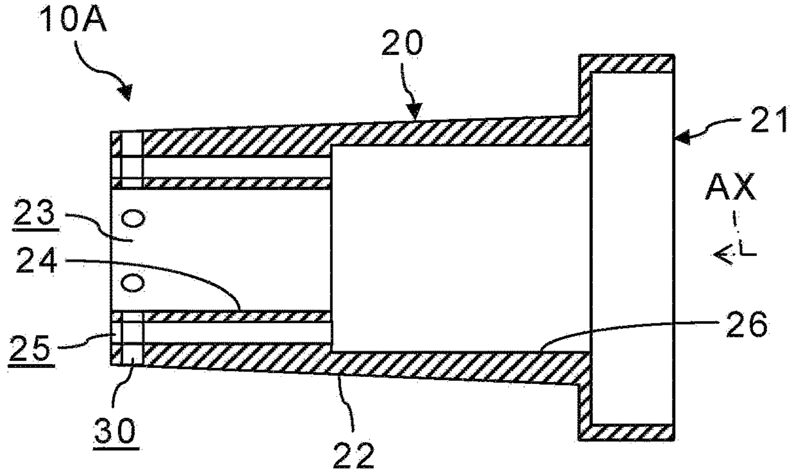
FIG. 7 is a longitudinal sectional view showing an example of structure of a collet bush according to the second implementation of the present invention.
Figure 8:
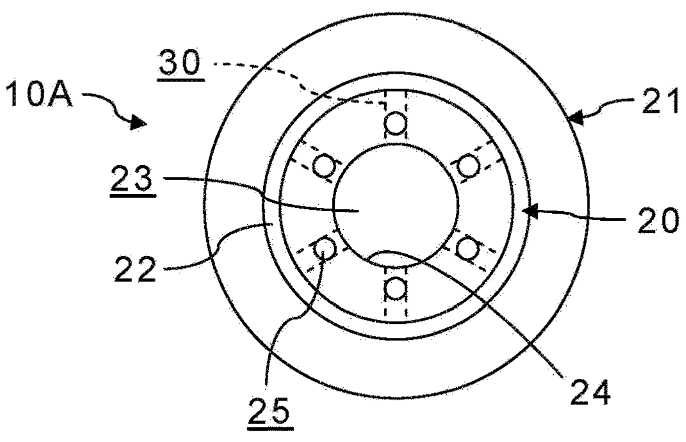
FIG. 8 is a left side view of the collet bush shown in FIG. 7.
Figure 9:
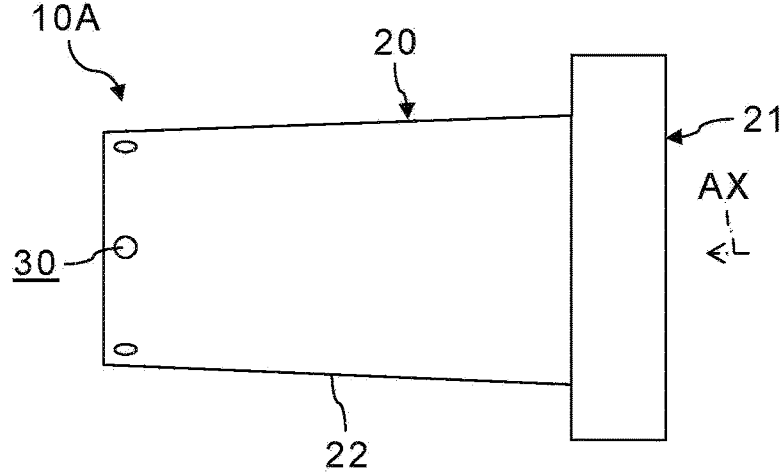
FIG. 9 is a top view of the collet bush shown in FIG. 7.

FIG. 7 is a longitudinal sectional view showing an example of structure of a collet bush according to the second implementation of the present invention. FIG. 8 is a left side view of the collet bush shown in FIG. 7. FIG. 9 is a top view of the collet bush shown in FIG. 7.

A collet bush 10A in the second implementation shown in FIGS. 7 to 9 is different from the collet bush 10 in the first implementation in that through holes 30 whose center axes are radial directions of the collet bush 10A are formed at the end portion on the distal end side. Other configurations and actions of the collet bush 10A in the second implementation are not substantially different from those of the collet bush 10 in the first implementation. Therefore, the same elements and the corresponding elements are denoted by the same reference signs while descriptions thereof are omitted.

As shown in FIGS. 7 to 9, the through hole 30 whose center axes are radial directions of the collet bush 10A can be formed as air flow paths for chip suction so as to intersect with the through holes 25 whose center axes are each in the length direction of the collet bush 10A. In this case, it is reasonable to intersect the central axes of the through holes 25 extending in the length direction of the collet bush 10A with the central axes of the through holes 30 extending in the radial directions of the collet bush 10A respectively, as exemplified in FIGS. 7 and 8.

When the through holes 30 extending in the radial directions of the collet bush 10A are added as air flow paths for chip suction as in the second implementation, it becomes possible to take in a sufficient flow rate of air in case of hole processing with bringing the end face of the collet bush 10A in the distal end side into contact with or close to the workpiece W. Accordingly, the chip suction effect can be secured.

Third Implementation

Figure 10:
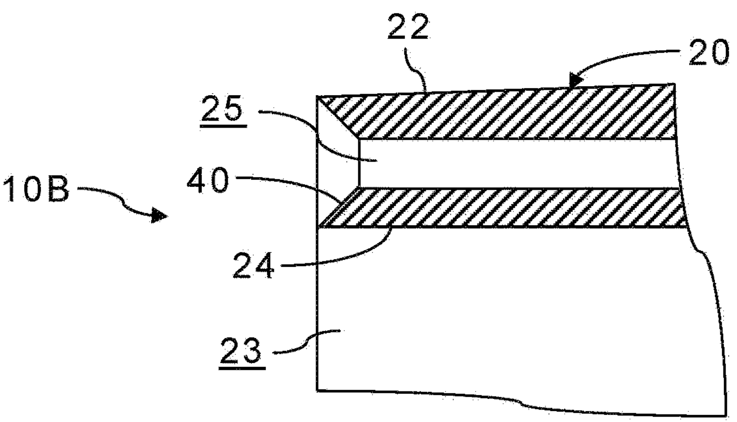
FIG. 10 is an enlarged partial longitudinal sectional view showing an example of structure of a collet bush according to the third implementation of the present invention.
Figure 11:
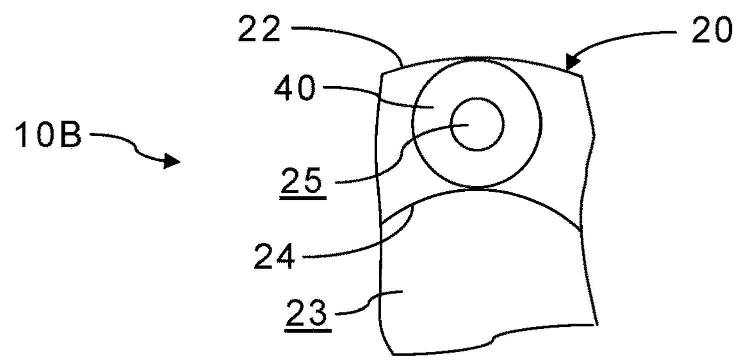
FIG. 11 is a partial left side view of the collet bush shown in FIG. 10.

FIG. 10 is an enlarged partial longitudinal sectional view showing an example of structure of a collet bush according to the third implementation of the present invention. FIG. 11 is a partial left side view of the collet bush shown in FIG. 10.

A collet bush 10B in the third implementation shown in FIGS. 10 and 11 is different from the collet bush 10 in the first implementation in that a chamfer 40 is formed around the end portion of each of the through holes 25 extending in the length direction of the collet bush 10B. Other configurations and actions of the collet bush 10B in the third implementation are not substantially different from those of the collet bush 10 in the first implementation. Therefore, only the end portion of the through hole 25 is illustrated, and the same elements and the corresponding elements are denoted by the same reference signs while descriptions thereof are omitted.

As exemplified in FIGS. 10 and 11, the chamfer 40, such as a C-chamfer or an R-chamfer, may be formed on the edge around at least one of the through holes 25 each opening on the end face of the collet bush 10B on the distal end side. Forming the chamfers 40 around the end portions of the through holes 25 allows widening the inlets of the air flow paths for chip suction while securing the plate thickness of the collet bush 10B on the distal end side. Specifically, the open ends of the through holes 25 serving as air inlets each forms a truncated conical space.

For this reason, according to the third implementation, it is possible to form air flows for chip suction toward the insides of the through holes 25 in case of hole processing with bringing the end face of the collet bush 10B in the distal end side close to the workpiece W.

Fourth Implementation

Figure 12:
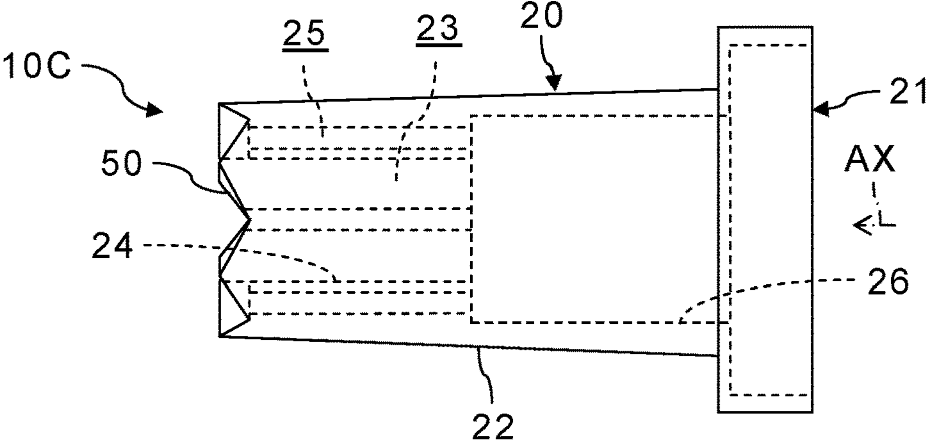
FIG. 12 is a front view showing an example of structure of a collet bush according to the fourth implementation of the present invention.
Figure 13:
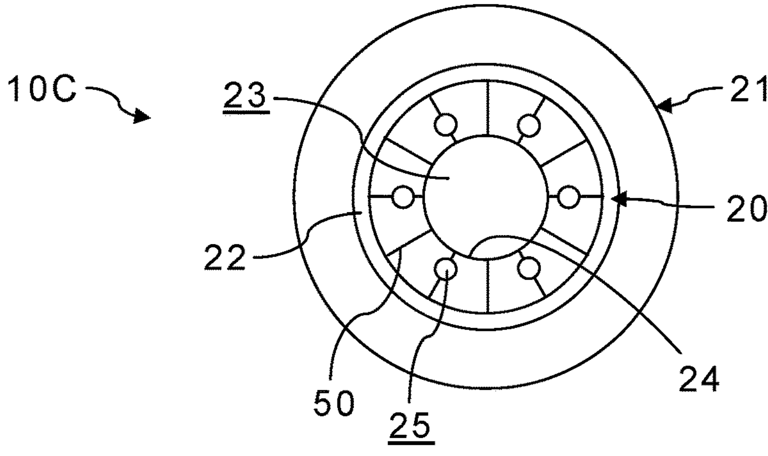
FIG. 13 is a left side view of the collet bush shown in FIG. 12.

FIG. 12 is a front view showing an example of structure of a collet bush according to the fourth implementation of the present invention. FIG. 13 is a left side view of the collet bush shown in FIG. 12.

A collet bush 10C in the fourth implementation shown in FIGS. 12 and 13 is different from the collet bush 10 in the first implementation in that the distal end has a jagged shape 50. Other configurations and actions of the collet bush 10C in the fourth implementation are not substantially different from those of the collet bush 10 in the first implementation. Therefore, the same elements and the corresponding elements are denoted by the same reference signs while descriptions thereof are omitted.

When the annular distal end of the collet bush 10C has the jagged shape 50, as exemplified in FIGS. 12 and 13, gaps are generated between the collet bush 10C and the workpiece W in case of bringing the distal end of the collet bush 10C into contact with or close to the workpiece W. That is, the distal end of the collet bush 10C does not have an end face whose normal direction is the central axis direction of the collet bush 10C. In this case, when the distal end of the collet bush 10C is brought into contact with the workpiece W, the form of contact is not surface contact but line contact intermittent in the circumferential direction of the collet bush 10C.

Therefore, not only when the distal end of the collet bush 10C is brought close to the workpiece W, but also when the distal end of the collet bush 10C is brought into contact with the workpiece W, a sufficient flow rate of air can be taken in from the gaps generated between the collet bush 10C and the workpiece W. Accordingly, the intervals between the peaks and valleys of the jagged shape 50 can be determined so that the through holes 25 each extending in the length direction of the collet bush 10C may open at the valleys of the jagged shape 50 respectively, as exemplified in FIGS. 12 and 13. In this case, when the distal end of the collet bush 10C is brought into contact with or close to the workpiece W, sufficient flow rates of air for chip suction can be made to flow into the through holes 25 from the gaps generated between the collet bush 10C and the workpiece W respectively.

According to the fourth implementation as described above, the recesses in the valleys of the jagged shape 50 formed on the distal end of the collet bush 10C can be used as air flow paths for chip suction. Therefore, even when the distal end of the collet bush 10C is brought into contact with or close to the workpiece W, the chip suction effect can be secured.

Fifth Implementation

Figure 14:
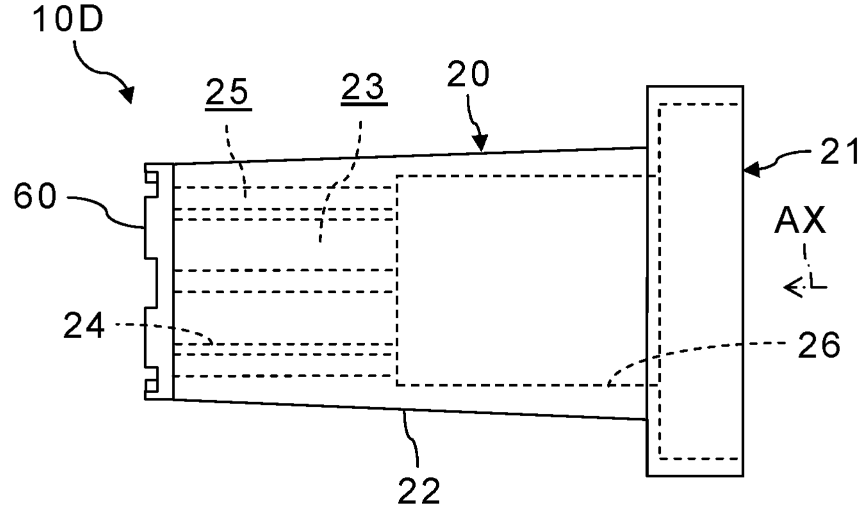
FIG. 14 is a front view showing an example of structure of a collet bush according to the fifth implementation of the present invention.
Figure 15:
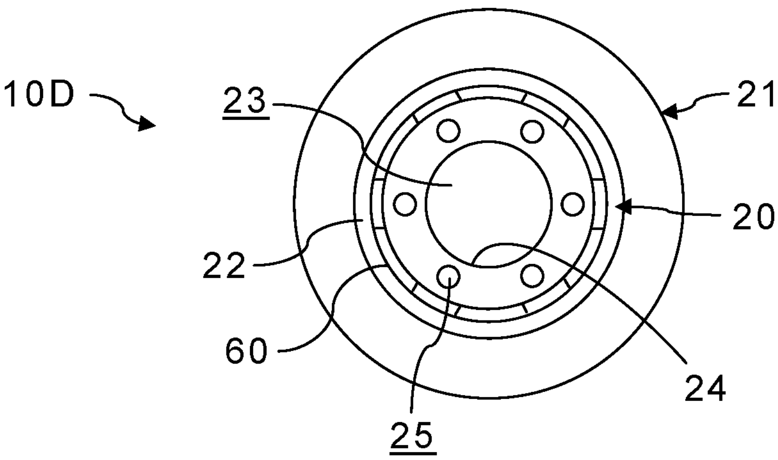
FIG. 15 is a left side view of the collet bush shown in FIG. 14.

FIG. 14 is a front view showing an example of structure of a collet bush according to the fifth implementation of the present invention. FIG. 15 is a left side view of the collet bush shown in FIG. 14.

A collet bush 10D in the fifth implementation shown in FIGS. 14 and 15 is different from the collet bush 10 in the first implementation in that a cushioning material 60 having unevenness is attached on the annular end face on the distal end side. Other configurations and actions of the collet bush 10D in the fifth implementation are not substantially different from those of the collet bush 10 in the first implementation. Therefore, the same elements and the corresponding elements are denoted by the same reference signs while descriptions thereof are omitted.

As exemplified in FIGS. 14 and 15, the cushioning material 60 having the unevenness in the length direction and the central axis direction of the collet bush 10D can be adhered on the annular end face of the collet bush 10D on the distal end side with an adhesive or the like. In this case, the depressions of the cushioning material 60 can be used as air flow paths for chip suction.

Accordingly, the intervals between the recesses and projections of the cushioning material 60 can be determined so that the through holes 25 each extending in the length direction of the collet bush 10D may open near the recesses respectively as exemplified in FIGS. 14 and 15. In this case, when the distal end of the collet bush 10D is brought into contact with or close to the workpiece W, sufficient flow rates of air for chip suction can be made to flow into the through holes 25 from the gaps generated between the cushioning material 60 and the workpiece W respectively.

Examples of material for the cushioning material 60 include a porous aluminum material, an elastic body made of rubber or the like, and a resin, such as polyacetal copolymer. The unevenness of the cushioning material 60 is not limited to the zigzag shape as exemplified in FIGS. 14 and 15, but may be a jagged shape having sharp tips as exemplified in FIGS. 12 and 13, a shape made by rounding peaks of a jagged shape, or a smooth wave shape.

According to the fifth implementation as described above, not only the chip suction effect can be secured in case of bringing the distal end of the collet bush 10D into contact with or close to the workpiece W, but also damage to the workpiece W can be prevented in case of bringing the distal end of the collet bush 10D into contact with the workpiece W since the cushioning material 60 is attached to the distal end of the collet bush 10D.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, implementations may be combined with each other. As a concrete example, in case of combining the second implementation with the third implementation, the chamfers 40 can be formed on peripheries of end portions of the through holes 25 each extending in the length direction of the collet bush 10A in the second implementation.

What is claimed is:

1. A collet bush to be inserted into a concentric collet that is attached to a handheld tool driving device in order to position the tool driving device to a workpiece, the tool driving device holding, rotating and feeding a tool, the tool driving device having a holder for holding the tool, and a motor for rotating the holder, the tool driving device having a function to suck chips, the collet bush having:

- a tapered cylindrical outer surface for expanding the concentric collet;
- a cylindrical inner surface having:
  - a first inner surface formed on a forward, distal side of the collet bush, the first inner surface forming a first through hole for slidingly fitting the tool; and
  - a second inner surface formed on a rear, proximal side of the collet bush compared to the first inner surface, the second inner surface having a diameter larger than a diameter of the first inner surface; and
- a flow path for taking in air used for sucking the chips inside the collet bush, and
- wherein the flow path includes at least one second through hole formed between the outer surface and the first inner surface for taking in air used for sucking the chips, and wherein one end of the at least one second through hole opens at an end face on the distal side of the collet bush, while another end of the at least one second through hole opens at an annular face formed as a level difference between the first inner surface and the second inner surface.

2. The collet bush according to claim 1, wherein the one end of the at least one second through hole is widened by chamfering a periphery of the one end of the at least one second through hole.

3. The collet bush according to claim 1, further having:

- a buffer material having recesses in a central axis direction of the collet bush, the buffer material being attached to the end face on the distal side of the collet bush, the flow path including the recesses.

4. The tool driving device comprising:

- the collet bush according to claim 1; and
- the concentric collet.

5. The tool driving device comprising:

- the collet bush according to claim 2; and
- the concentric collet.

6. The tool driving device comprising:

- the collet bush according to claim 3; and
- the concentric collet.

7. The tool driving device comprising:

- the collet bush according to claim 1;
- the concentric collet, and
- a housing for housing the motor and holder, and
- wherein each of the collet bush and concentric collet have a flanged proximal end that is secured to the housing of the tool driving device as to fix the concentric collet and the collet bush in position relative to the housing during fixing of the tool driving device relative to the workpiece.

8. The tool driving device according to claim 7, further comprising a threaded cap that fixedly clamps the flanged proximal ends of the concentric collet and collet bush against a distal end of the housing.

9. The collet bush according to claim 1, wherein the at least one second through hole comprises a plurality of concentrically spaced second through holes each formed between the outer surface and the inner surface and extending in a length direction of the collet bush, and wherein the collet bush is configured such that while the plurality of concentrically spaced second through holes are sucking the chips inside the collet bush, the first through hole is slidably fitting the tool.

10. The collet bush according to claim 9, wherein a plurality of radially extending through holes extend from the outer surface inward toward the inner surface and open into respective ones of said plurality of concentrically spaced second through holes at a location closer to the distal ends of the second through holes than the proximal ends of the second through holes.

11. The collet bush according to claim 1, further comprising at least one radially extending through hole that extends from the outer surface and opens into the flow path at a location proximal to a distal free edge of the distal end of the collet bush.

12. The collet bush according to claim 3, wherein the buffer material is a cushioning material.

13. The collet bush according to claim 3, wherein the buffer material defines a zig-zag jagged shaped distal end.

14. The collet bush according to claim 1, wherein the at least one second through hole formed between the outer surface and the inner surface has a central axis that is parallel to a central axis of the first through hole.

15. A collet bush to be inserted into a concentric collet that is attached to a handheld tool driving device in order to position the tool driving device to a workpiece, the tool driving device holding, rotating and feeding a tool, the tool driving device having a function to suck chips, the collet bush having:

- a tapered cylindrical outer surface for expanding the concentric collet;
- a cylindrical inner surface forming a first through hole for slidably fitting the tool; and
- a flow path for taking in air used for sucking the chips inside the collet bush,
- wherein the flow path includes at least one second through hole formed between the outer surface and the inner surface, a central axis of the at least one second through hole being parallel to a central axis of the first through hole.

16. The collet bush according to claim 15, wherein the at least one second through hole comprises a plurality of concentrically spaced second through holes each formed between the outer surface and the inner surface and extending in a length direction of the collet bush, and wherein the collet bush is configured such that while the plurality of concentrically spaced second through holes are sucking the chips inside the collet bush, the first through hole is slidably fitting the tool.

17. The collet bush according to claim 16, wherein the cylindrical inner surface of the collet bush comprises a first inner surface region and a second inner surface region, with the first inner surface region being more distally positioned than the second inner surface region, and the first inner surface region being of a diameter sized for the slidable fitting of the tool and the second inner surface region having a larger diameter than the first inner surface region as to define a stepped region and a chamber within the collet bush, and wherein the plurality of concentrically spaced second through holes each have a distal end opening out at the distal end of the collet bush and a more proximal end located at the stepped region and opening out into the chamber.

18. The collet bush according to claim 17, wherein the cylindrical inner surface of the collet bush comprises a third inner surface region that has a larger diameter than the second inner surface region as to define a cylindrical cup flange at the proximal end of the collet bush.

19. The collet bush according to claim 15, further having: a buffer material having recesses in a central axis direction of the collet bush, the buffer material being attached to an annular end face, on the distal side, of the collet bush, the flow path including the recesses.

20. The tool driving device comprising: the collet bush according to claim 15; and the concentric collet.

* * * * *